Aug. 30, 1932.  P. B. WALLACE  1,874,720

FILTER

Filed Sept. 30, 1930

INVENTOR.
PHILIP B. WALLACE.
ATTORNEYS.

Patented Aug. 30, 1932

1,874,720

UNITED STATES PATENT OFFICE

PHILIP B. WALLACE, OF SAN MATEO, CALIFORNIA

FILTER

Application filed September 30, 1930. Serial No. 485,475.

My present invention relates to filters and screens and more particularly to a filter or screen which can be connected in a pipe line in a novel manner and in which the filtering or screening medium is embodied in a separate part that can be quickly and conveniently removed, cleaned and replaced without disturbing the pipe line proper.

An object of my invention is to provide a new and novel type of filter for pipe lines which can be removed, cleaned and replaced in a simple and convenient manner.

A further object of my invention is to provide a novel type of filtering element which may be disposed in a pipe line in such a manner that it will not materially interfere with the circulation of a fluid through the pipe line.

Other objects and advantages of my invention will be in part evident and in part pointed out in the following description taken in connection with the drawing, wherein like numerals refer to like parts throughout the several views.

For the purpose of a description of my invention I have illustrated in the accompanying drawing a filter or screen for a commercial gas pipe line. This filter or screen functions to remove any entrained solid matter or moisture which is carried along with the gas by virtue of its velocity. I desire to have it understood, however, that the structural features of my invention are equally adaptable to pipe lines for other types of fluids.

In providing such a filter or screen in a pipe line it is necessary that the filtering medium be so constructed that it will not materially interfere with the flow of the fluid therethrough. As the velocity of flow of the fluid through the filtering medium will be necessarily slower than at points where the pipe line is unobstructed, it will be evident that by enlarging the filtering area it will be possible to pass therethrough a sufficient volume of gas at this slower velocity to maintain the normal flow of fluid at the discharge outlet of the filter.

If such a filter is placed directly into a pipe line where its surface is exposed to the direct flow of the fluids the solid particles carried by the fluid will be projected against the face thereof and consequently fill up the filtering surface and render it inoperative sooner than would be the case were these solid particles diverted from the filter surface proper. In order to accomplish the above and provide a filter which will overcome the above objections, I propose to use a plurality of filtering elements which are disposed at right angles to the normal flow of fluid through the pipe line. I also locate the filter surfaces so that the heavier particles and precipitated moisture will be directed out of the fluid stream before the fluid is passed through the filtering elements.

For a better understanding of my invention reference should be had to the accompanying drawing wherein I have shown by way of illustration and not of limitation a preferred embodiment thereof.

Figure 1:
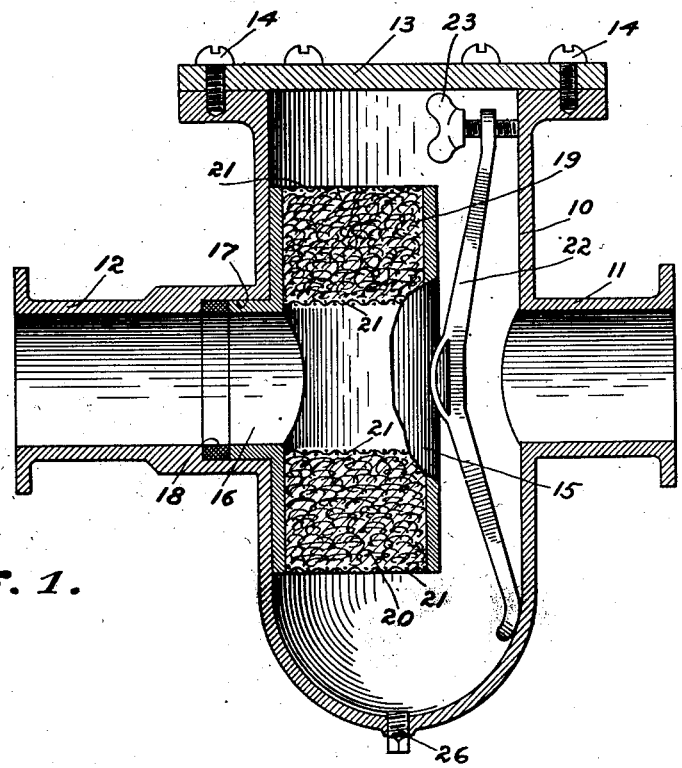
Figure 1 is a vertical sectional view showing the features of my filter.
Figure 2:
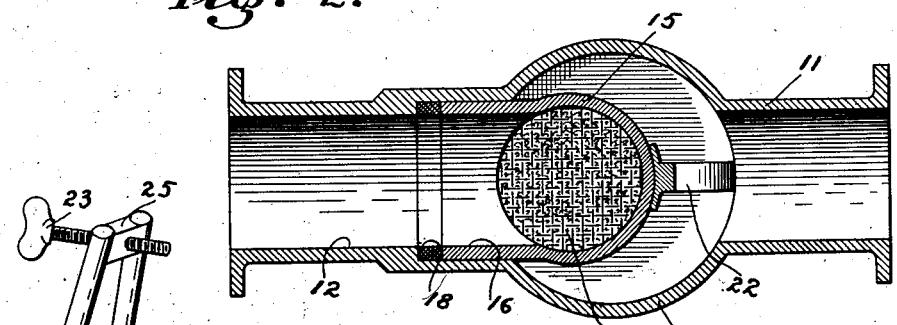
Figure 2 is a plan view in section taken along line II—II of Figure 1.

In Figure 1 of the drawing I show my invention as embodied in a structure that is particularly suited to a gas pipe line. The structure here shown comprises a main receptacle 10 which may be fabricated in any suitable way. In the illustration, I have shown it as a single casting with inlet and outlet openings 11 and 12 respectively formed integrally with the receptacle portion 10. The inlet and outlet openings 11 and 12 are provided with flanges to facilitate a connection with the pipe line, but it should be understood that these openings may be provided with screw threads where such fittings are used. The top of the receptacle 10 is provided with a hand hole cover 13 which when removed will permit an easy and convenient removal and adjustment of the interior parts. The hand hole cover 13 is secured in place by screws 14.

Within the receptacle 10, I show a vertically disposed cylindrical filter supporting member 15 which extends at right angles to the direction of the pipe line proper. The supporting member 15 is provided with a central projecting nipple or conduit 16 which with the vertical portion forms what might be termed a T-shaped member. The nipple 16 is shown as projecting into a recessed seat 17 formed in the outlet 12. At the bottom of the recess there is also shown a suitable packing 18 with which the end of the nipple 16 engages. At the top and bottom ends of the support 15, I show respectively filtering means 19 and 20. As illustrated, these filtering means comprise suitably disposed wire screen elements 21 between which steel wool, hair or in fact any other suitable material may be placed. It is contemplated that for some uses materials having certain absorbent qualities may be substituted for the last described filtering materials.

In the arrangement described above, the filter means 19 and 20 are not exposed to the direct flow of the fluid entering the inlet 11 and consequently a large portion of the entrained solid particles carried by the fluid will be directed out of the fluid stream by the walls of the support 15 and fall down into the bottom of the chamber 10 and as a result only the lighter particles will contact with the surface of the filters. With the filters 19 and 20 disposed as illustrated, it will be readily appreciated that only the lighter particles will flow upwardly in the chamber 10 and consequently the upper filter 19 may be finer than the lower filter 20 which will be engaged by some of the heavier particles. This difference of fineness between the upper and lower filtering elements will also be found advantageous where the filter is used in a pipe line which carries a slow flowing fluid having components of different specific gravity, such as would be the case in certain gas lines where some of the lighter gases separate from the heavier gases and flow along the upper part of the conduit. With such a fluid it will be evident that the two filters, when constructed of different materials which are particularly suited to the fluid components, will operate simultaneously to pass and clean the two component gases in their proper proportion.

In order to secure the filtering supporting member 15 in position within the receptacle 10 and the nipple 16 in sealed engagement with the packing 18, I provide an adjustable clamp or wedging member 22 which engages the inner wall of the receptacle 10 at two points and exerts pressure against the supporting member 15 at a point diametrically opposite the nipple 16. This wedging member 22, as illustrated in Figure 1, is of such shape that it will not interfere with the free flow of fluid through the inlet 11 adjacent which it is placed. This wedging member 22 can be of any suitable form. In the drawing I have shown it as provided with an adjustable thumb screw 23 by which it can be easily and conveniently tightened into place.

Figures 3, 4:
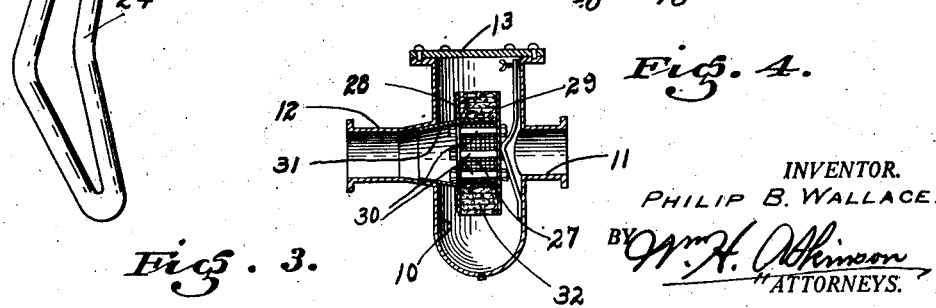
Figure 3 is a perspective view of a modified form of filter retaining means.
Figure 4 is a vertical sectional view showing a modified form of my improved filter.

In Figure 3 of the drawing a modified wedging member 24 is shown as formed of a rod of metal bent back upon itself and having a suitable screw supporting block 25 welded to the ends thereof. The middle portions of the member 24 are shown as bowed out so as to contact with the side wall of the filter supporting member 15 at two points and thus form with the recess 17 a three point securing means for the member 15. This latter wedging means, like the former, is of such construction that it will not interfere with a free flow of fluid through the inlet 11 and the receptacle 10. At the bottom of the receptacle 10, which by virtue of its disposition forms a trap, I provide a drain plug 26 which can be removed to permit the discharge of any water or other foreign matter.

In the drawing the filter supporting member 15 is shown as of substantially the same diameter as the pipe line. With these proportions the filter surface will have an area equal to twice the area of the pipe line and consequently the gases may flow slower through the filters than in the pipe line without reducing the normal flow in the pipe line proper.

In practice, with heavy fluids I may use filter elements of much larger area than the diameter of the pipe line and thus without materially extending the receptacle 10 above and below the pipe line provide a filter which will easily handle any flow of fluid.

In operation, as the fluid enters the chamber 10 through the inlet 11, it will divide into two paths, one portion passing through the filter 19 and the other portion passing through the filter 20. After the fluid has thus passed through the two filter elements it will then pass out through the outlet 12 and continue on through the pipe line. In the event that the fluid is one which comprises ingredients of different specific gravity or has entrained therein relatively light and heavier particles, the lighter fluid and particles will rise in the chamber 10 and pass through the filter 19 while the heavier fluid and particles will pass downwardly and through the filter 20. Under these conditions as the fluid enters the inlet 11 it will strike the walls of the supporting member 15 and as a result a considerable portion of the entrained solids will be deflected out of the fluid stream without engaging the filters and will fall to the bottom of the receptacle 10 where it can be removed by withdrawing the plug 26.

While the filter is in operation the support 15 with the filters 19 and 20 will be held in place in the chamber 10 by the wedging member 22 which can be firmly secured in place by turning up the thumb screw 23. In practice, the packing 18 is so proportioned that when pressure is exerted by the member 22 upon the filter support 15, the packing 18 will be under compression so as to seal the outlet opening 12 against the escape of fluid around the filter supporting element 15 at its sides.

With the above construction it will be readily seen that should the filters 19 and 20 become clogged up or be otherwise rendered inoperative they can be conveniently removed for cleaning by unscrewing the thumb screw 23 and withdrawing the wedging member 22 which will then permit an easy withdrawal of the nipple or conduit 16 from the outlet 12 so that the complete filter assembly can be removed from the receptacle 10 through the hand hole opening at its top.

In the embodiment of my invention illustrated in Figure 4, I have provided an annular filtering surface which is disposed concentrically with the inlet and outlet pipes 11 and 12 but which by virtue of its diameter lies out of the direct line of flow of fluid through the pipe line. With this arrangement it will be seen that the filtering element will function in substantially the same manner as do the filter elements above described.

In constructing this latter type of filter I provide a spool like support having a hub 27 of screen material and impervious end flanges 28 and 29. The flanges 28 and 29 are in this present embodiment shown as held in position upon the hub 27 by tie bolts 30 but in practice I may construct this spool like structure in other ways. Extending from the flange 28 there is a fluid conduit extension 31 which connects with the outlet 12. This conduit 31 communicates with the interior of the screen like hub 27 so that fluids passing through an annular filtering medium 32 wrapped about the hub 27 may flow into the outlet 12. The flange 29 unlike flange 28 is in the form of a solid disk and functions as a baffle against which the incoming fluid will flow and deflect any solid particles in the fluid, as in the case of the first described filter.

While I have, for the sake of clearness and in order to disclose my invention so that the same can be readily understood, described and illustrated specific devices and arrangements, I desire to have it understood that this invention is not limited to the specific means disclosed but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described my invention, what I claim and desire to secure by Letters Patent is:

1. In a filter screen for pipe lines and the like, the combination of a receptacle having inlet and outlet openings in the walls thereof, a cylindrical member in said receptacle disposed transversely of the direction of flow through the inlet and outlet openings of said receptacle, filter means arranged in each end of said cylindrical member, a connection intermediate the ends of said latter member between said filter means connecting with the outlet opening of said receptacle, and an adjustable removable wedge between the inner wall of said receptacle and said cylindrical member for holding the latter in an operative position with respect to the inlet and outlet openings in the receptacle.

2. A filter element for pipe lines and the like, comprising a T shaped member having its central leg adapted to connect with one side of a fluid conduit and having filtering means mounted in each end of its top portion beyond its central leg, and an enlarged enclosing receptacle surrounding said T shaped member and communicating with one side of the fluid conduit, whereby any fluid passing through the filtering means in either direction will flow in two paths which are angularly disposed with respect to the fluid conduit.

3. In a pipe line for gaseous fluids, the combination of a vertically disposed cylindrical housing of a diameter substantially larger than that of the pipe line, a cylindrical filter supporting member disposed in said housing at right angles to the pipe line, said supporting member having a filtering means in each end and a fluid conduit there between which connects with one side of the pipe line, a packing between said fluid conduit and the pipe line, and an adjustable wedging means within the cylindrical housing for holding the conduit of said cylindrical member in position and said packing under compression, said wedging member being of such construction and so disposed that it will not interfere with the free flow of fluid to or from the filtering means.

4. In a pipe line for gaseous fluids, the combination of a vertically disposed receptacle of a size substantially larger than that of the pipe line, a cylindrical filter supporting member disposed in said receptacle with its axis at right angles to the pipe line, a filtering means in each end of said cylindrical member, a fluid conduit extending from the side of said cylindrical supporting member between said filtering means which connects with one side of the pipe line, a packing between said fluid conduit and the pipe line, and means within the receptacle for holding said cylindrcal member in position against said packing.

5. In a filter element for slow flowing fluids having ingredients of different specific gravity which may flow in different strata, the combination of a horizontally disposed fluid conduit, a receptacle forming an enlarged chamber connected in said conduit, and a vertically disposed conduit forming member within said enlarged chamber having a central connection communicating with said conduit at the outlet of said receptacle and having a filtering means at its top and bottom ends, the filtering means in the top end of said vertical member being suitable for filtering the fluids of lighter specific gravity and the filtering means in the bottom end of said vertical member being adapted to filter the fluids of higher specific gravity.

PHILIP B. WALLACE.